United States Patent [19]
Ritzmann

[11] 3,932,117
[45] Jan. 13, 1976

[54] METHOD OF BURNING OR SINTERING FINE-GRAIN MATERIAL

[75] Inventor: Horst Ritzmann, Enniger, Germany

[73] Assignee: Polysius AG, Neubeckum, Germany

[22] Filed: Sept. 19, 1974

[21] Appl. No.: 507,410

[30] Foreign Application Priority Data
Oct. 10, 1973  Germany............................ 2350768

[52] U.S. Cl. ...................... 432/14; 34/10; 432/58; 432/106
[51] Int. Cl.² ...................... F27B 15/00; F26B 3/08
[58] Field of Search ................ 432/14, 58, 106, 15; 34/10, 57 R

[56] References Cited
UNITED STATES PATENTS

| | | |
|---|---|---|
| 3,452,968 | 7/1969 | Shimizu et al. ........................ 432/58 |
| 3,744,962 | 7/1973 | Ritzmann............................... 34/10 |
| 3,752,455 | 8/1973 | Zacpal et al. ........................ 432/58 |
| 3,834,860 | 9/1974 | Fukuda et al. ........................ 432/58 |
| 3,843,314 | 10/1974 | Ishikawa ............................. 432/58 |

*Primary Examiner*—John J. Camby
*Attorney, Agent, or Firm*—Learman & McCulloch

[57] ABSTRACT

A method of burning or sintering fine-grain material which agglomerates above a critical temperature, such as cement raw meal, lime, dolomite, magnesite, in which the material is first preheated in a first zone, then flame heated in a second zone to a final treatment temperature and thereafter separated in a third zone from the hot exhaust gases of the second zone, the exhaust gases of the second zone being used for preheating the material in the first zone.

8 Claims, 2 Drawing Figures

METHOD OF BURNING OR SINTERING FINE-GRAIN MATERIAL

BACKGROUND OF THE INVENTION

It is known to burn, calcine or sinter fine-grain material by heating of preheated material to the final treatment temperature in a rotary kiln. However, this method involves considerable plant costs and careful maintenance, particularly of rotating parts.

It is further known (German Pat. No. 474,727) to burn fine-grain material in a vertical shaft through which the material passes from the top to the bottom and the gas from the bottom to the top, a burning zone equipped with burners being provided in the center portion of the shaft. The upwardly flowing exhaust gases preheat the material while the burnt material is cooled in the lower portion of the shaft by the rising secondary air. Because in such methods the material must move in counterflow relationship to the gases where fine-grain material is involved, it is impossible to use high gas velocities and thus impossible to attain high throughput capacities.

A largely uncontrolled relative movement of material and gas is also present in a further known method (German Pat. No. 498,406) in which the material is blown from the bottom upwardly into a shaft furnace and allowed to drop down in the form of a cloud through the rising hot gases. The hot gases in this case are produced by burners disposed in the lower region of the furnace just above the material injection point. Because in this known method the residence time of the individual particles in the hot zone cannot be controlled exactly, uniform burning of the entire material is not possible.

A method is also known (German Pat. No. 1,218,927) in which fine material preheated in cyclones is introduced into a conduit which leads from a burning chamber to a fine material separator. The fine material however does not come into contact with the zone of highest temperature, i.e. with the actual flame zone. Consequently, with this method the relatively short path over which the hot exhaust gases of the burning chamber are in contact with the fine material does not transmit the high quantity of heat necessary to achieve the final treatment temperature uniformly to the entire material.

Furthermore, a method of treating fine-grain ore is known (German Pat. No. 423,620) in which the mixture of ore dust, air and fuel is set in turbulent motion in a space in front of a reaction chamber and then blown into the reaction space. The ore particles melt in the reaction chamber and are withdrawn from the latter in the molten state. Such a method however easily leads to formation of deposits in the reaction chamber and this involves considerable maintenance work. Moreover, because of the largely undefined turbulent motion of the ore particles in the reaction chamber the thermal treatment of the ore is very irregular.

SUMMARY OF THE INVENTION

To obviate the foregoing disadvantages of presently used methods a further method (DT-AS 1,807,292) developed by applicants provides for introducing the preheated fine material mixed with combustion air and fuel through the end face of a tubular burning or sintering chamber to cause the material to pass through the burning or sintering zone with high velocity over a predetermined time interval and to pass with the hot gases into a fine material separator connected to the other end face of the burner or sintering chamber. In this manner all material is uniformly exposed to a high temperature treatment defined by the flight time and reliably brought to the final treatment temperature. Because with this method the fine material is uniformly exposed to the zone of maximum temperature, flow rates can be used which are high enough to permit greater throughput capacities to be achieved with a relatively small constructional expenditure.

The invention is based on the problem of further developing the method referred to above so that material which agglomerates or forms the melt phase above a critical temperature less than the final treatment temperature and thus tends to adhere or form deposits (for example cement raw meal) can be burned or sintered, uniformly and without formation of troublesome deposits in the apparatus.

According to the invention this problem is solved by passing the hot exhaust gases from the second zone (in which the material is heated to the final treatment temperature) into the first zone (in which the material is preheated) and by adding additional heat and combustion air to these exhaust gases in the first zone to supply the heat quantity necessary to enable the final treatment temperature of the material to be achieved during a rapid transit of the flame in the second zone while not exceeding the critical temperature while the material is in the first zone.

The invention is based on the knowledge that the exceedingly short time in which the fine material passes the flame of the second zone with high velocity is enough to enable the entire fine material to be brought uniformly to the final treatment temperature only if the material is supplied to the second zone in an already highly heated state. As has been found in more exact investigations for various materials this high preheating of the material cannot be achieved solely with the hot exhaust gases of the second zone. For this reason, according to the invention additional heat is also introduced into the first zone. However, in the proportioning of this heat it must be ensured on the other hand that in the first zone the critical temperature (above which the preheated material agglomerates and thus tends to adhere and form deposits) is not exceeded.

The method according to the invention is distinguished above all in that with an extremely small technical expenditure for plant, fine-grain material can be burned or sintered very uniformly and with a high throughput capacity. A particular advantage is that the burned or sintered material remains in the fine-grain state so that after separation and cooling thereof it is generally not necessary to conduct an appreciable grinding. A considerable reduction of the construction or expenditure necessary for the cooling of the calcined or sintered material is also achieved.

The method of the invention also provides an air flow surrounding the flame in the second zone which protects the wall of the flame chamber from deposit formation, this flow also cooling the material and the hot exhaust gases on the way to the third zone to a value beneath the critical temperature and finally being supplied with the preheating gases as combustion air for the additional fuel burned in the first zone.

A triple utilization of the air flow first enables a large part of the otherwise wasted heat of radiation present in the second zone and the heat of the calcined or sintered material to be utilized for preheating the combustion air for the additional fuel of the first zone.

The method also utilizes air flows extracted from after-cooling of the material in the third zone both as air flow surrounding the flame and as combustion air for the second zone.

Further optimization resides in that the after-cooling of the material deposited in the third zone is effected in several stages with a cooling air supply such that the cooling air of higher temperature forms the combustion air of the second zone and the cooling air of lower temperature the air flow surrounding the flame.

Two examples of embodiment of a plant for carrying out the method according to the invention are illustrated in the drawings.

IN THE DRAWINGS

Figure 1:
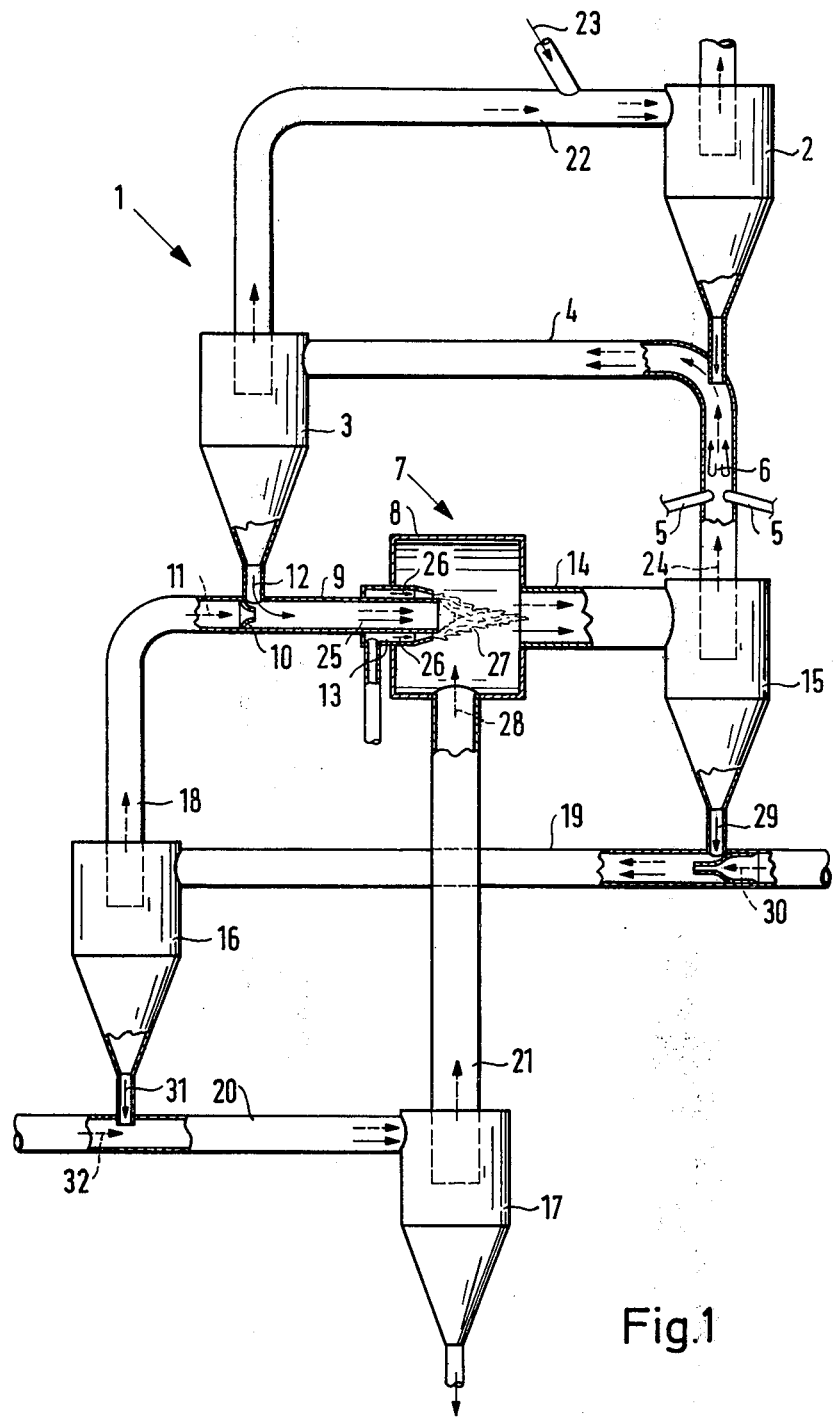
FIG. 1 is a schematic diagram of one form of the invention.

The plant illustrated in FIG. 1 for burning fine-grain material, such as cement raw meal, includes a preheater 1 containing two (or more) cyclones 2, 3 and a conduit 4 with burners 5 which forms a preheating zone 6 which will be referred to as the "first zone" or "preheating zone" of the method according to the invention.

The plant according to FIG. 1 further contains a burner or sintering means 7 whose essential component is a relatively short tubular burning chamber 8 representing the "second" or "final heating" zone of the method according to the invention. The burning chamber 8 is preceded by a mixing chamber 9 into which passes both combustion air (arrow 11) from an injection nozzle 10 and preheated material (arrow 12) from the cyclone 3. The mouth of the mixing chamber 9 in this example is coaxially surrounded by a fuel supply conduit 13.

Material and hot exhaust gases pass from the fuel chamber 8 via a conduit 14 to a separator 15 forming the "third" or "separation-cooling" zone of the method according to the invention.

Hot gases are separated from the material in cyclone 15, the gases passing upwardly (arrow 24) into the preheating zone 6 and the material passing downwardly (arrow 29) into conduit 19. From conduit 19 the material, mixed with cooling air introduced at 30, passes into cyclone 16 where a second separation occurs, the gases passing upwardly through conduit 18 and the material passing downwardly (arrow 31) into a conduit 20. Cooling air (arrow 32) is mixed with the material in conduit 20 and conducts the material to a third cyclone 17 where a final separation occurs, gases separated in cyclone 17 passing upwardly (arrows 28) through conduit 21 to burning chamber 8.

The mode of operation of the plant is as follows:

The material whose movement is indicated by the full-line arrow (the gas flow being represented by dash-line arrows) is introduced into the conduit 22 (arrow 23) and passes with the exhaust gases of the cyclone 3 into the cyclone 2, being separated therein and dropping into the preheating zone 6 formed by the burners 5. The hot exhaust gases (arrows 14 and 24) coming from burner chamber 8 via separator 15 deflect the material beneath the preheating zone 6 and entrain the material upwardly so that it passes through the preheating zone at least twice. The material is very highly preheated, preferably almost approaching the critical temperature above which the agglomerates form. Thus, when burning cement raw meal practically the entire calcining of the material takes place in this preheating zone 6.

The material then passes with the gases through conduit 4 into the separator 3. The material separated in separator 3 (arrow 12) enters mixing chamber 9 where it is intimately mixed with the combustion air (arrow 11) supplied through nozzle 10 before the mixture (arrow 25) enters combustion chamber 8. The material is blown at high velocity into combustion chamber 8 and passes through the flame 27 in a very short defined time. Flame 27 is surrounded by an airflow (arrow 28) which is introduced into chamber 8 from conduit 21 in the form of a tangentially directed twisting flow about the flame axis. The air flow deflects or guides material through chamber 8 in a path such that the material, now well above its critical temperature does not contact the wall of combustion chamber 8 to form deposits and sedimentation on the chamber wall. At the same time the air flow from conduit 28 cools the material and the hot exhaust gases on their way to the separator 15 to such an extent that when the material reaches cyclone 15 its temperature is below the critical temperature above which deposits form.

The material introduced into separator 15 (arrow 29) is discharged into conduit 19 and transported by cooling air (arrow 30) into the cyclone 16. From cyclone 16 the material (arrow 31) is transported by cooling air introduced (arrow 32) into conduit 20 into cyclone 17 from which the now cooled material is discharged. Cooling air flows via conduit 21 to the combustion chamber 8.

Material from the final heating zone or burner chamber 8 is thus subjected to a three-stage separation and cooling sequence in which fresh cooling air is introduced and mixed with the material between each stage. The hottest gases are separated from the material in the first stage (cyclone 15) and utilized for preheating and combustion air in the preheated 6. Cooling air introduced at 30 between the first and second stages extracts heat from the material and is then separated in the second stage in cyclone 16 and conducted via conduits 18 and 9 to serve as combustion air for burner chamber 8. Cooling air introduced at 32 between the second and third stages is separated in the third stage at cyclone 17 and then employed as the guiding and cooling air flow in burner chamber 8.

Figure 2:
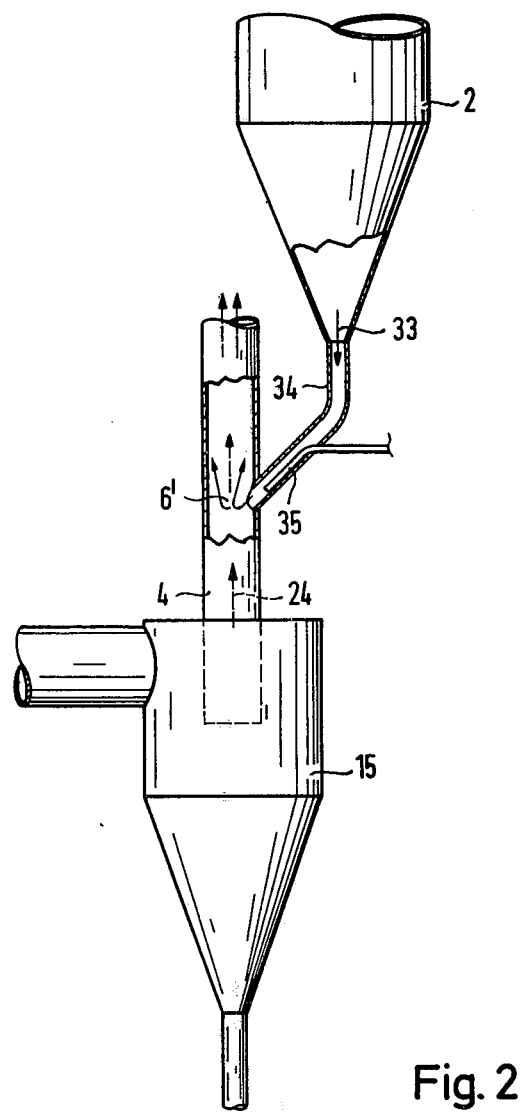
FIG. 2 is a schematic diagram of a modification to the system of FIG. 1.

FIG. 2 shows a modified embodiment of the preheating zone 6'. The material preheated in the cyclone 2 (arrow 33) is introduced via a conduit 34 into the conduit 4 leading from the separator 15 to the cyclone 3. Prior to its complete dissolution in the rising hot gas stream (arrow 24) coming from the separator 15 fuel is added to the material, which may for example be done by means of a fuel conduit 34 arranged in the conduit 34. The mixing of material and fuel may be done partly in the conduit 34 and partly in the region of the entry of the conduit 34 into the conduit 4.

As in the example of embodiment according to FIG. 1 in the plant according to FIG. 2 as well the high preheating of the material (close to the critical temperature) is effected on the one hand by the hot exhaust gases from the chamber 8 and on the other by the fuel introduced additionally into the preheating zone 6 or 6'.

What is claimed is:

1. In a method of burning or sintering fine-grained material, such as cement raw meal, lime, dolomite, magnesite or hydrate of alumina, which agglomerates above a critical temperature wherein a gas-carried flow of material is passed successively through a preheating zone, a final heating zone wherein the material is heated to a final treatment temperature higher than said critical temperature by passing a flame, and a separation-cooling zone wherein the material is separated from the hot exhaust gases of said final heating zone and the separated hot exhaust gases are conducted to said preheating zone to preheat material therein; the improvement comprising the steps of introducing material into an elevated portion of said preheating zone to cause said introduced material to fall downwardly through said zone, and introducing the exhaust gases from said final heating zone into a lower portion of said preheating zone in an upwardly directed stream establishing an upwardly directed flow operable to carry the introduced material upwardly through said preheating zone to an elevated discharge opening, the path of said material through said preheating zone including a downwardly directed section and an upwardly directed section and supplementing the preheating of said material by said exhaust gases by adding heat to said preheating zone at a location traversed by both the upward and downward sections of said path to supply enough additional heat to said preheating zone to heat the material therein to a temperature less than said critical temperature but high enough to enable the material to be heated to said final temperature during transmit of said final heating zone.

2. The invention defined in claim 1, further comprising the steps of introducing a first flow of air into said final heating zone to guide material passing therethrough along a predetermined path and to cool the material to a temperature less than said critical temperature during transit from said final heating zone to said separation-cooling zone, and conducting gases separated from said material in said separation-cooling zone to said preheating zone to preheat material therein.

3. The invention defined in claim 2, further comprising the step of extracting said first flow of air from a region of relatively cool air in said separation-cooling zone.

4. The invention defined in claim 3, further comprising the steps of cooling and separating gases from said material in said separation-cooling zone in a plurality of successive separation-cooling stages, conducting the gases separated from said material in one of said stages to said final heating zone as said first flow of air, and conduting the gases separated from the material in another of said stages to said final heating zone to supply said combustion air.

5. The invention defined in claim 4 further comprising the steps of introducing cooling air into the flow of material between each of the successive stages of said separation-cooling zone.

6. The invention defined in claim 5 futher comprising the steps of passing material and gases from said final heating zone successively to a first, a second, and a third of said plurality of stages, conducting the gases separated from said material in said first stage to said preheating zone, conducting the gases separated from said material in said second stage to said final heating zone to supply combustion air thereto, and utilizing gases separated from said material in said third stage as said first flow of air.

7. The invention defined in claim 2 wherein said final heating zone is located within an enclosed chamber further comprising the step of introducing said first flow of air into said chamber in a path such that the flow of material through said chamber is maintained out of contact with the walls of said chamber by said first flow of air until the material has cooled by said first flow of air from its final treatment temperature to a temperature less than said critical temperature.

8. The invention defined in claim 7 wherein said combustion air from said second stage is mixed with said material prior to the introduction of said material to said final heating zone.

* * * * *